United States Patent
Yockey (10) Patent No.: US 12,049,352 B2
(45) Date of Patent: Jul. 30, 2024

(54) APPARATUS FOR DISPENSING FILL MATERIAL INTO A GOLF COURSE DIVOT HOLE

(71) Applicant: Mantis Product Development Corporation, Pinckney, MI (US)

(72) Inventor: Steve Yockey, Ann Arbor, MI (US)

(73) Assignee: Mantis Product Development Corporation, Pinckney, MI (US)

( * ) Notice: Subject to any disclaimer, the term of this patent is extended or adjusted under 35 U.S.C. 154(b) by 0 days.

(21) Appl. No.: 17/942,625

(22) Filed: Sep. 12, 2022

(65) Prior Publication Data
US 2023/0002143 A1    Jan. 5, 2023

Related U.S. Application Data

(63) Continuation of application No. 17/154,188, filed on Jan. 21, 2021, now abandoned.

(60) Provisional application No. 62/964,373, filed on Jan. 22, 2020.

(51) Int. Cl.
*B65D 83/06* (2006.01)
*A01C 7/02* (2006.01)
*A63B 57/50* (2015.01)

(52) U.S. Cl.
CPC ............. *B65D 83/06* (2013.01); *A01C 7/02* (2013.01); *A63B 57/50* (2015.10)

(58) Field of Classification Search
CPC .............. B65D 83/06; B65D 2251/105; B65D 2543/00666; A63B 57/50; A47G 23/0216; A47G 23/0208

USPC ........................................................ 222/567
See application file for complete search history.

(56) References Cited

U.S. PATENT DOCUMENTS

| | | | |
|---|---|---|---|
| 2,033,931 A | 3/1936 | Erne | |
| 2,360,224 A | 10/1944 | Hannaford | |
| 2,594,858 A | 4/1952 | Bowman | |
| 2,804,999 A * | 9/1957 | Keith | B65D 83/06 |
| | | | 222/246 |
| 3,120,912 A | 2/1964 | Mount | |
| 3,337,109 A | 8/1967 | Shumrak | |
| 4,606,523 A | 8/1986 | Statz et al. | |
| 5,143,337 A | 9/1992 | Tomayko, Jr. et al. | |
| 5,199,678 A * | 4/1993 | Luebke | A47C 7/62 |
| | | | 248/205.2 |
| 5,758,804 A | 6/1998 | Wirth | |
| D463,225 S | 9/2002 | Winkler | |

(Continued)

FOREIGN PATENT DOCUMENTS

| | | | |
|---|---|---|---|
| WO | WO-2014020312 A1 * | 2/2014 | ............. A01C 15/02 |
| WO | WO-2014023018 A1 * | 2/2014 | ............. B65D 47/10 |

*Primary Examiner* — Bob Zadeh
*Assistant Examiner* — Michael J. Melaragno
(74) *Attorney, Agent, or Firm* — Hoffmann & Baron, LLP (57) ABSTRACT

A bottle for storing grass seeds, soil, and/or fertilizer used for filling a golf divot is provided. The bottle includes a bottom section having a base and a perimetrical sidewall extending therefrom to an open end to define an interior. A pair of bosses extend outwardly from the sidewall at the open end. The top section has a perimetrical edge and a top surface with a spout extending therefrom for discharging the contents of the bottle. A pair of latches that extend from the perimetrical edge and pivot downwardly to engage the bosses to secure the top section to the bottom section. The bottle can also be part of an assembly that includes the bottle and a holder.

18 Claims, 6 Drawing Sheets

(56) References Cited

U.S. PATENT DOCUMENTS

| | | |
|---|---|---|
| D463,226 S | 9/2002 | Winkler |
| D482,193 S | 11/2003 | Hahn |
| 7,216,785 B1 | 5/2007 | Meyer et al. |
| 7,677,276 B2 | 3/2010 | Sun |
| 7,971,760 B1 | 7/2011 | Winkler |
| 10,065,774 B1 | 9/2018 | Daniels, Jr. et al. |
| 10,596,429 B1 | 3/2020 | Danboise et al. |
| 2002/0033402 A1 | 3/2002 | Winkler |
| 2002/0037779 A1 | 3/2002 | Meyer et al. |
| 2002/0056728 A1 | 5/2002 | Winkler |
| 2002/0109062 A1 | 8/2002 | Fowler |
| 2002/0162765 A1 | 11/2002 | Okin et al. |
| 2004/0129731 A1 | 7/2004 | Hahn |
| 2007/0062949 A1 | 3/2007 | Bordner |
| 2007/0108210 A1 | 5/2007 | Alvares et al. |
| 2007/0210227 A1 | 9/2007 | Krall |
| 2009/0072055 A1* | 3/2009 | Flanagan-Kent ...... A01C 15/02 222/533 |
| 2012/0248133 A1 | 10/2012 | Danks et al. |
| 2013/0020340 A1 | 1/2013 | Geuther et al. |
| 2013/0200229 A1 | 8/2013 | Corey et al. |
| 2013/0248564 A1 | 9/2013 | Human |
| 2016/0001959 A1* | 1/2016 | Long, Sr. ........... B65D 77/0493 222/81 |
| 2016/0075487 A1 | 3/2016 | Lin et al. |
| 2017/0143141 A1 | 5/2017 | Jaeckel |
| 2018/0332972 A1 | 11/2018 | Jaeckel |
| 2023/0062184 A1* | 3/2023 | Garcia ................... B65D 75/52 |

\* cited by examiner

APPARATUS FOR DISPENSING FILL MATERIAL INTO A GOLF COURSE DIVOT HOLE

CROSS REFERENCE TO RELATED APPLICATIONS

This application is a continuation of U.S. patent application Ser. No. 17/154,188, filed on Jan. 21, 2021, which claims the benefit of and priority to U.S. Provisional Patent Application No. 62/964,373, filed on Jan. 22, 2020, which is incorporated herein in its entirety.

FIELD OF THE INVENTION

The present invention is a bottle or container for storing, transporting, and dispensing fill material for repairing a golf course divot hole. In particular, the present invention relates to a bottle that includes a lid that can be easily opened to refill the bottle and a flanged exterior surface that provides easy storage of the bottle when not in use.

BACKGROUND

When a golfer strikes a golf ball lying in the grass, he or she typically slices into the grass below the roots and leaves a hole in the turf that is referred to as a divot. Replacing the displaced grass in the divot is typically unsatisfactory because the roots have been damaged and the grass will not grow. Therefore, many golf carts are provided with a bottle or container attached to the cart that holds grass seeds, soil and or fertilizer. After a golfer completes a shot, he or she removes the bottle from a holder, fills the divot with the contents of the bottle and then places the bottle back in the holder.

Many of the bottles or holders that are currently being used have a two-piece construction, wherein the open ends are threaded and the two pieces screw together. However, moist sand can create a cement like adhesion on the threads of the cap after tightening. This is disruptive to the refilling process for golf course operations; mainly in wasted time spent refilling bottles by the staff. The average golf course operation typically re-fills a minimum 80-120 sand bottles a day. Screw on caps are often broken and are easily lost or misplaced. It is a constant replacement battle for the supplier and golf course. The screwed on cap design has several problems, including worn threads and the inconvenience of having to unscrew the two halves, fill the bottle and then re-screw the halves together. Therefore, there is a need for a bottle that can be more easily disassembled, refilled, and reassembled.

SUMMARY

In accordance with the present invention, a bottle for storing grass seeds, soil, and/or fertilizer used for filling a golf divot is provided. The bottle includes a bottom section and a top section.

The bottom section includes a base and a perimetrical sidewall extending therefrom to an open end to define an interior. The bottom section can also have a flanged ring extending outwardly from a midsection of the perimetrical sidewall and one or more handgrips in the perimetrical sidewall. Preferably, the handgrips are located between the base and the flanged ring. In preferred embodiments, the bottom section can have a handle attached to the perimetrical sidewall that can extend between the flanged ring and the open end. The open end of the bottom section has a circumferential edge that, preferably, slopes upwardly and away from the handle.

A pair of bosses extend outwardly from the sidewall at the open end and, as described below, can be engaged by a pair of latches to secure the top and bottom sections together. Each of the pair of bosses is preferably located on an opposite side of the perimetrical sidewall in a recessed portion of the perimetrical sidewall. The recessed portions facilitate unlatching the top section from the bottom section.

The top section has a perimetrical edge and a top surface with a spout extending therefrom with an opening that provides communication with the interior of the bottom section. The spout is used for discharging the contents of the bottle. The spout can have a curved outer surface, a distal end, and a proximal end, wherein the distal end has a cross-sectional area that is less than a cross-sectional area of the proximal end. This minimizes clogging when materials are poured out through the spout.

A pair of latches extend from the perimetrical edge. Each of the latches has an aperture that receives one of the bosses when the latches are pivoted downwardly and engage the bosses. The top section snugly engages the open end of the bottom section and the latches engage the bosses to secure the top section to the bottom section.

The bottle can also be part of an assembly that includes the bottle and a holder. The holder includes a tubular sleeve having a sidewall extending between top and bottom open ends. The holder is configured to receive the bottom section of the bottle and includes one or more mounting studs or apertures for securing the holder to a structure on a golf cart. The bottle is inserted into the holder and passes through until it is engaged by the flanged ring. In some embodiments, a section of the sidewall of the holder is substantially flat to facilitate mounting the holder to a flat surface.

BRIEF DESCRIPTION OF THE FIGURES

The preferred embodiments of the bottle for storing grass seeds, soil, and/or fertilizer used for filling a golf divot of the present invention, as well as other objects, features and advantages of this invention, will be apparent from the accompanying drawings wherein.

DETAILED DESCRIPTION

The present invention is a container or bottle for storing grass seeds, soil, and/or fertilizer used for filling a golf divot. As used herein, the terms "container" and "bottle" are synonymous and refer to a vessel for storing, transporting, and dispensing materials used to fill golf divots. The bottle includes a bottom section and a detachable top section.

The bottom section has a base and a perimetrical sidewall extending therefrom to an open end to define an interior. The bottom section can have a flanged ring extending outwardly from the middle and one or more handgrips is recessed in the perimetrical sidewall. The bottom section can have a handle instead of the handgrip, wherein the handle extends between the middle of the bottle (also referred to herein as the midsection) or flanged ring and the open end. In some embodiments, the bottom section can have both a handle and a handgrip. A pair of bosses used for attaching the top section extend outwardly from the sidewall at the open end. The bosses are located in recessed portions of the sidewall and are preferably located on opposite sides of the bottom section.

The top section has a perimetrical edge and a top surface with a spout extending therefrom. The spout has an opening or a mouth that provides communication with the interior. The top section also can have a pair of pivoting latches that extend from the perimetrical edge and have apertures near the distal ends. The perimetrical edge matingly engages the open end of the bottom section and the latches pivot downwardly to engage the bosses and secure the top section to the bottom section.

The bottle can also be provided as part of an assembly that includes the bottle and a holder that is mounted to a golf cart. The holder includes a perimetrical sidewall having top and bottom open ends and one or more mounting studs or apertures for securing the holder to a structure on a golf cart. The top open end of the holder is configured to receive the bottom section of the bottle. The bottle passes through the top open end of the holder until it engages the flanged ring.

One of the novel features of the design is that the bottle can be used with multiple pouring openings, spouts or nozzles. In the golf market depending on the geography, many different sand, seed, and fertilizer blends, and mixtures thereof are used depending on the type of grass on a golf course or on the specific requirements of the groundskeeper. The bottle is designed so that the same bottle can be used by changing the top section that includes the spout in order to meet the requirements of the user. For example, a large, long neck as opposed to a short, narrow spout reduces over pouring and wasted pours so that a golfer does not run out of fill material before the round of golf is completed. In addition, the design eliminates threads and the need for a screw on cap.

The bottle design allows for a low cost with maximum durability. The top spout is injection molded, which allows for the addition of a rubber additive based polypropylene that is virtually indestructible. The bottom section of the bottle is preferably made from blow-molded polyethylene that is both inexpensive and durable.

The novel configuration of the bosses and latches that secure the top and bottom sections together allow for quick release and a durable, snap-on mechanism. This design can withstand multiple years of repetitive releases because of the rubber based properties of the materials used for the fabrication.

The bottle can be provided with a holder that is attached to a golf cart at an accessible location. The bottle is placed in the holder when not in use. The holder is a sleeve with open ends and a circumferential sidewall that extends between top and bottom perimetrical edges. The holder is configured to receive the bottom section of the bottle and engage the flanged ring, which prevents the bottle from passing through the holder. The holder can have one or more mounting apertures that are used to attach the holder to a structure on the golf cart.

Figure 1:
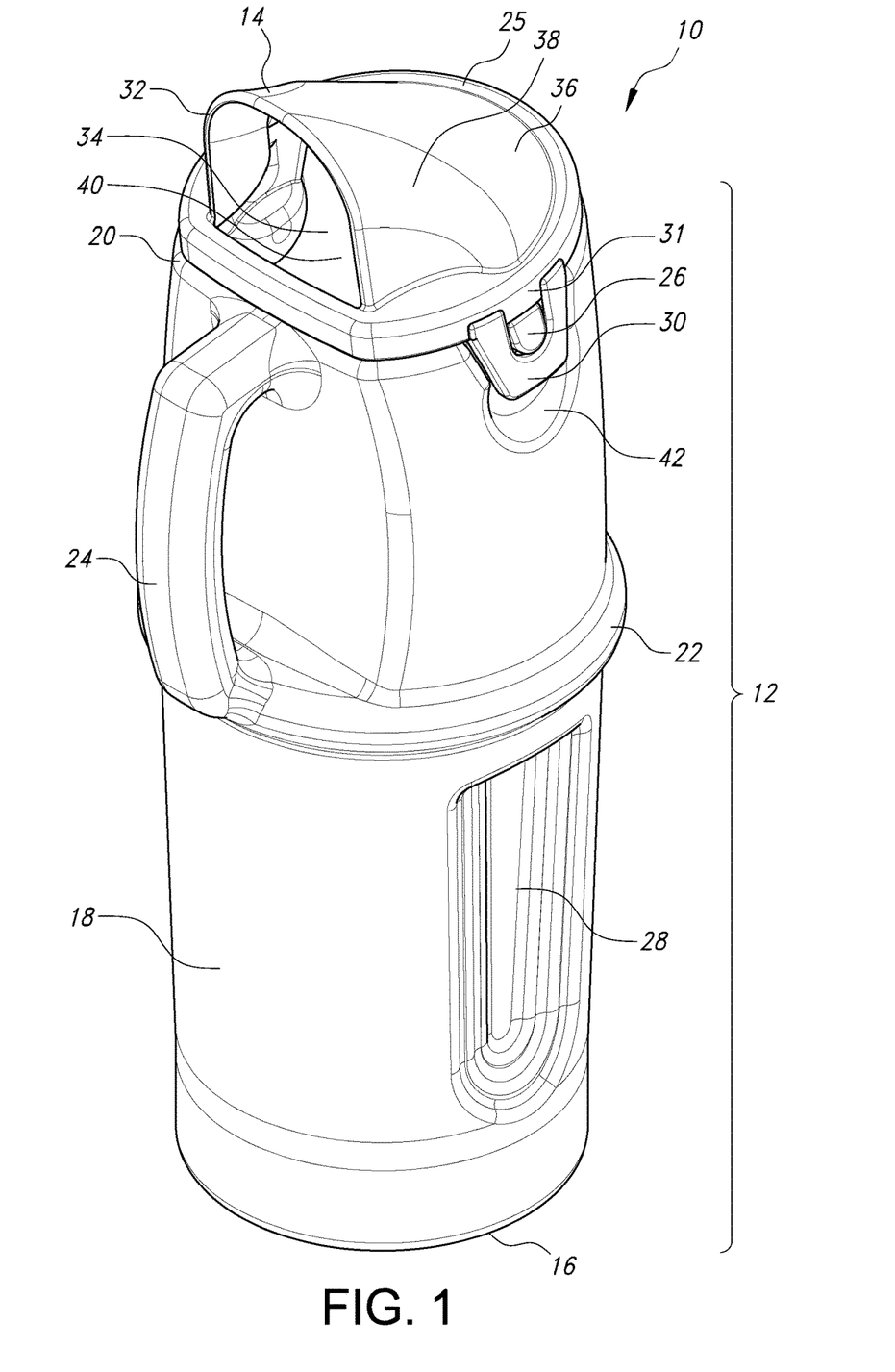
FIG. 1 is a perspective top view of a preferred embodiment of the bottle.

Referring to the accompanying drawings, FIGS. 1-8 show various views of the bottle. FIG. 1 shows a preferred embodiment of the bottle 10 that is constructed in two sections, a bottom section 12 and a top section 14. The bottom section 12 has a base 16 and a perimetrical sidewall 18 extending upwardly therefrom to an open end 27 (FIG. 7) with a circumferential edge 20. The bottom section 12 also has a flanged ring 22 that extends from the exterior of the sidewall 18 near the midsection and a handle 24 located between the flanged ring 22 and the circumferential edge 20 of the open end 27. The portion of the bottom section 12 below the flanged ring 22 can have one or more handgrips 28 formed by depressions or recessed portions in the sidewall 18 that the user can employ to grip the bottle 10. A pair of bosses 26 extend outwardly from opposing locations on the sidewall 18 near the circumferential edge 20. The bosses 26 have finger detents 42 recessed in the sidewall 18 surface, which allow the user to access and more easily release the latches 30 for removal of the top section 14.

The top section 14 of the bottle 10 has a perimeter edge 25 that has the same configuration as the circumferential edge 20 of the open end 27 of the bottom section 12. A pair of latches 30 with apertures 31 extend from the circumferential edge 20 and are pivoted downwardly to engage the two bosses 26 on the bottom section 12 in the apertures 31 to secure the top section 14 and bottom section 12 together. The top section 14 also has a top surface 36 with a spout 32 extending upwardly therefrom. The spout 32 has a curved sidewall 38 that extends from the top surface 36 to a mouth 34 that provides access to the interior 40 of the bottom section 12 when the two sections 12, 14 are connected. Pointing the spout 32 in a downward direction causes the fill material in the interior of the bottle 10 to flow through the spout 32.

Figure 2:
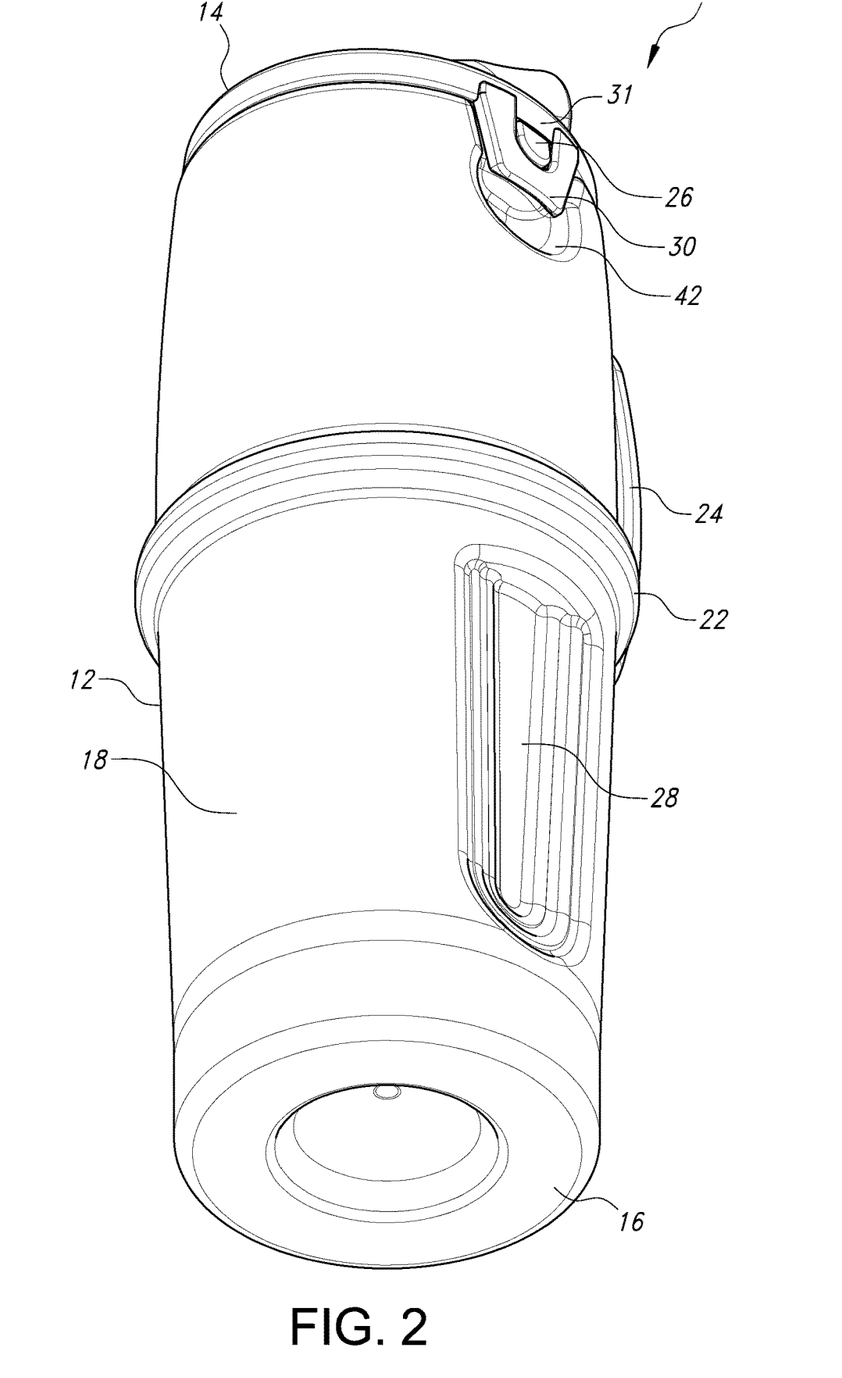
FIG. 2 is a perspective bottom view of the bottle shown in FIG. 1.

FIG. 2 is a perspective bottom view of the bottle 10 and shows how the handgrips 28 (only one shown) are recesses in the sidewall 18 and can be easily grasped and the bottle 10 held without slippage. FIG. 2 also shows how the apertures 31 in the latches 30 (only one shown) surround the bosses 26 (only one shown) on three sides and secures the top section 14 to the bottom section 12.

Figure 3:
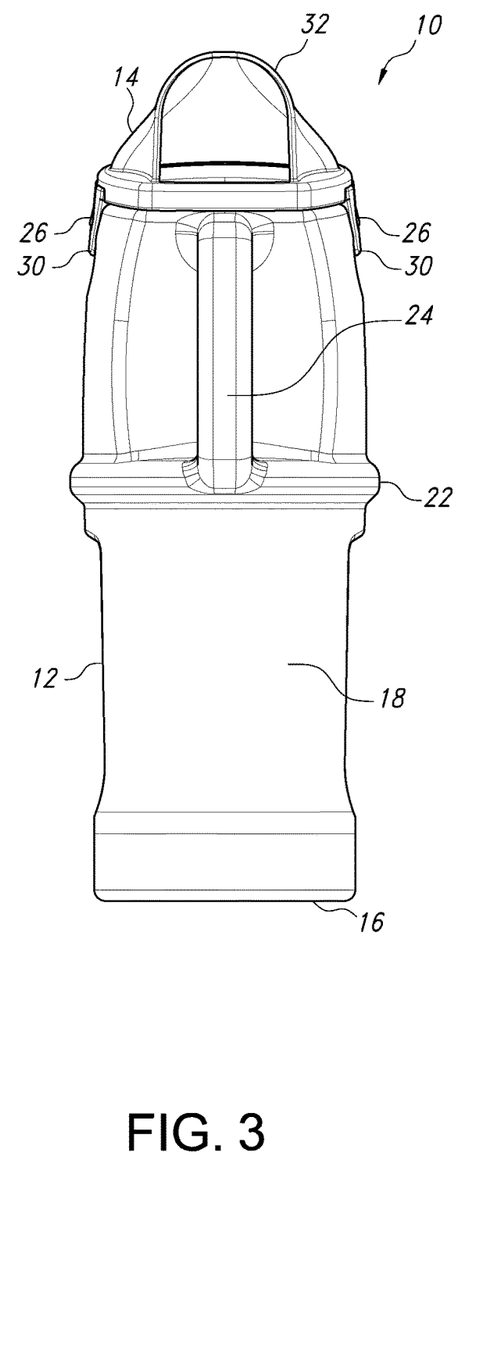
FIG. 3 is a side front view of the bottle shown in FIG. 1.
Figure 4:
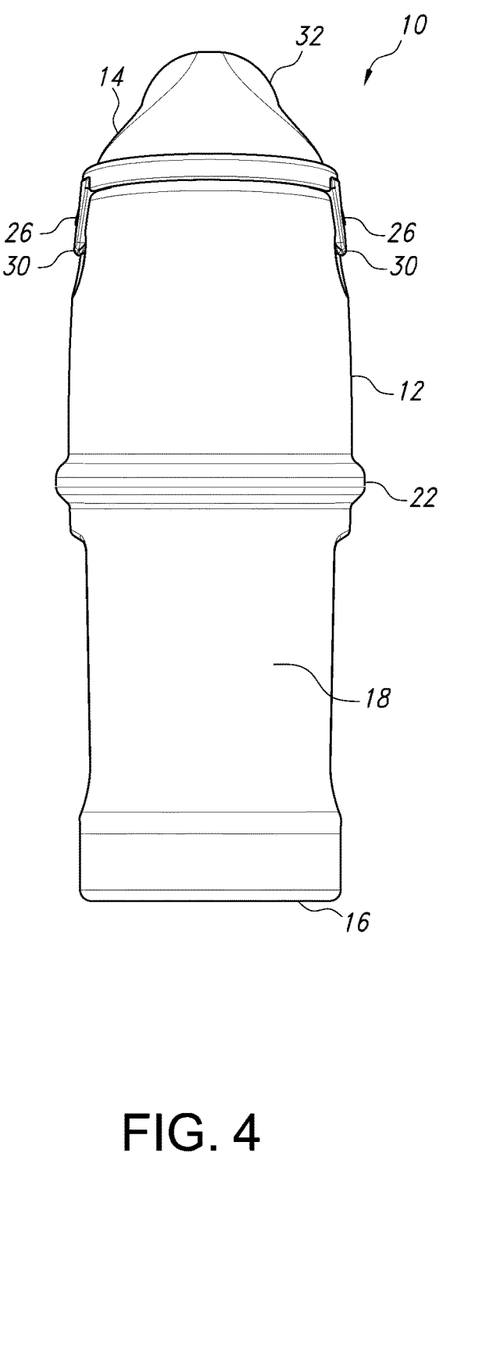
FIG. 4 is a side rear view of the bottle shown in FIG. 1.
Figure 5:
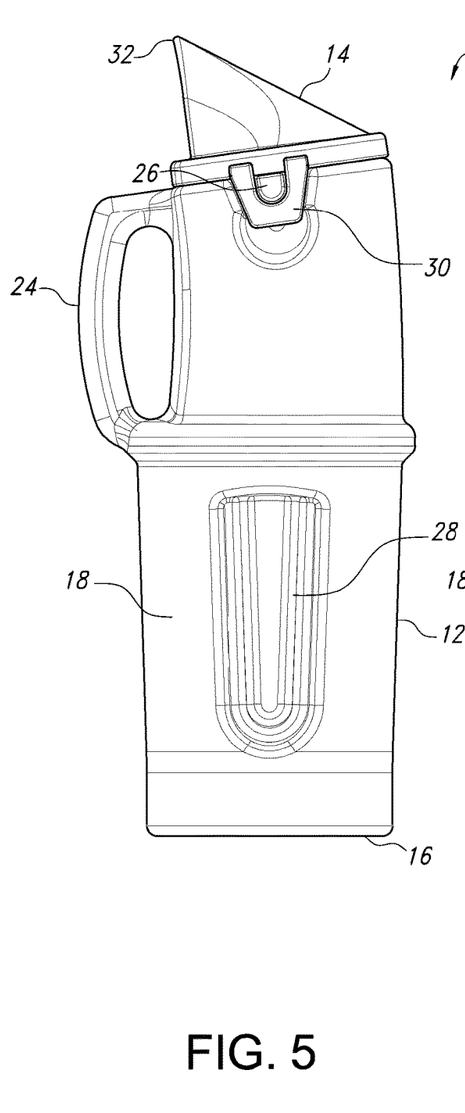
FIG. 5 is a right side view of the bottle shown in FIG. 1.
Figure 6:
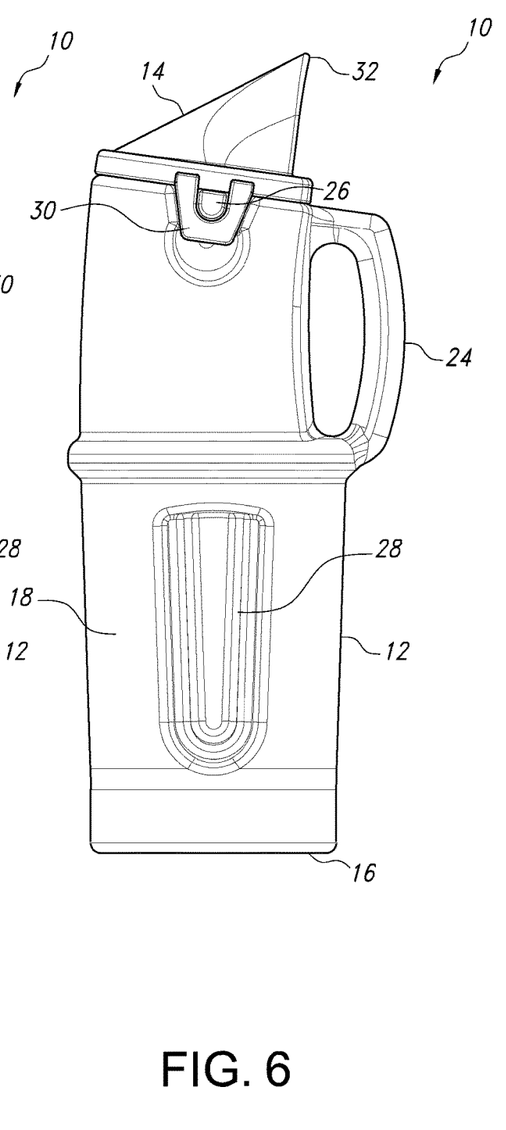
FIG. 6 is a left side view of the bottle shown in FIG. 1.

FIGS. 3 and 4 show front and rear views of the bottle 10 with the latches 30 secured to the bosses 26 on opposing sides of the bottle 10. FIG. 3 also shows how the handle 24 extends between the flanged ring 22 and the circumferential edge 20 at the open end of the bottom section 12. The mouth 34 of the spout 32 is on the same side of the bottle 10 as the handle 24 to facilitate pouring the fill material in the bottle 10 into a divot. FIGS. 5 and 6 show right side and left side views of the bottle 10.

Figure 7:
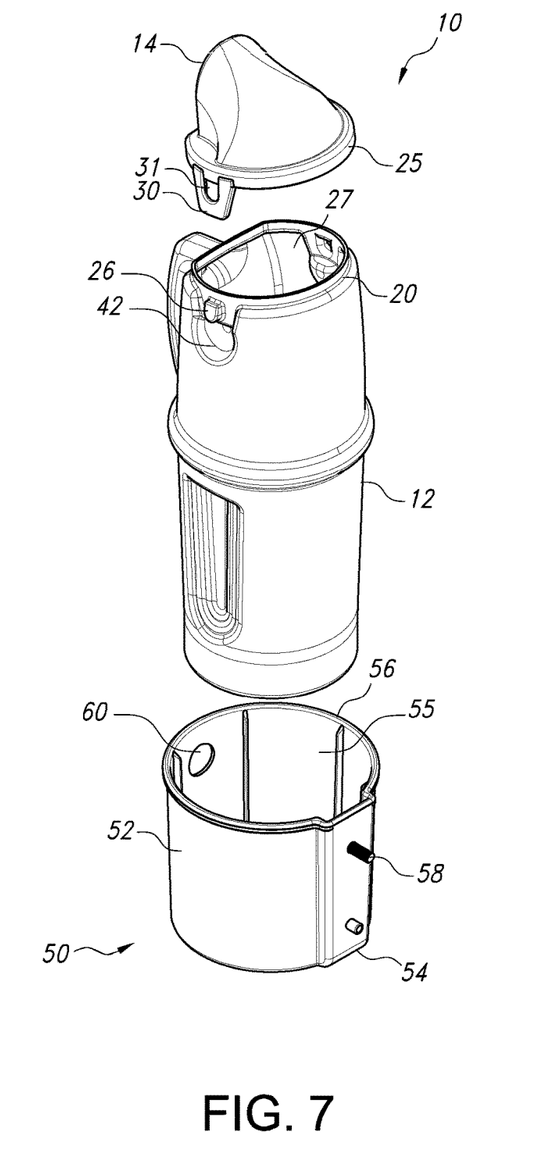
FIG. 7 is an exploded top perspective view of the bottle shown in FIG. 1.
Figure 8:
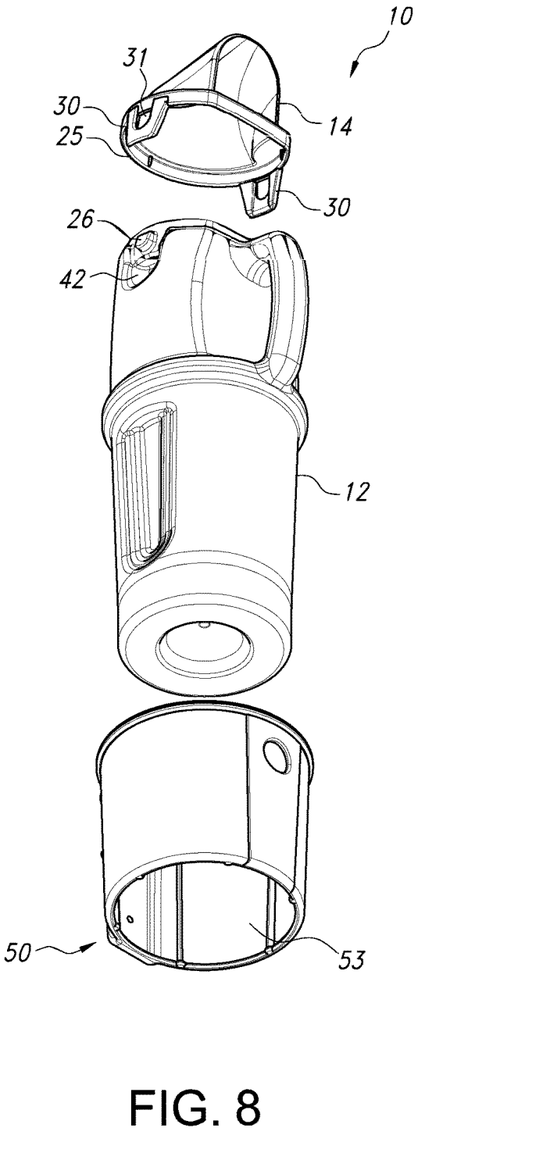
FIG. 8 is an exploded bottom perspective view of the bottle shown in FIG. 1.

FIGS. 7 and 8 show exploded views of the bottle 10 and a holder 50 that receives the bottle 10. The holder 50 has top and bottom open ends 53, 55 and a perimetrical sidewall 52 that extends between top and bottom edges 54, 56. The holder can have studs extending outwardly from the perimetrical sidewall 52 or mounting apertures 60 therein that are used to attach the holder to a structure on a golf cart. The bottom section 12 of the bottle 10 is inserted into the holder 50 and passes through the holder 50 until the flanged ring 22 on the bottle 10 engages the top edge 56 of the holder 50 and prevents further insertion.

Figure 9:
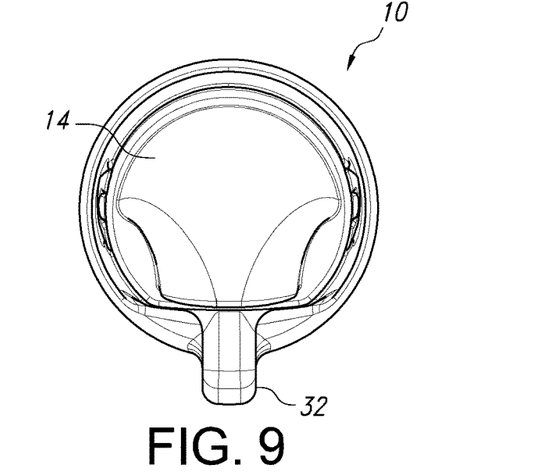
FIG. 9 is a top view of the bottle shown in FIG. 1.
Figure 10:
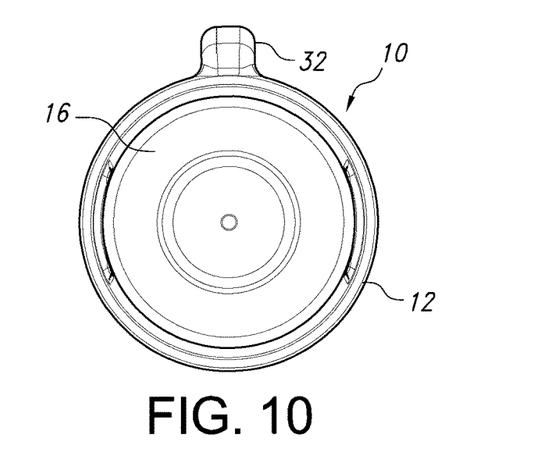
FIG. 10 is a bottom view of the bottle shown in FIG. 1.
Figure 11:
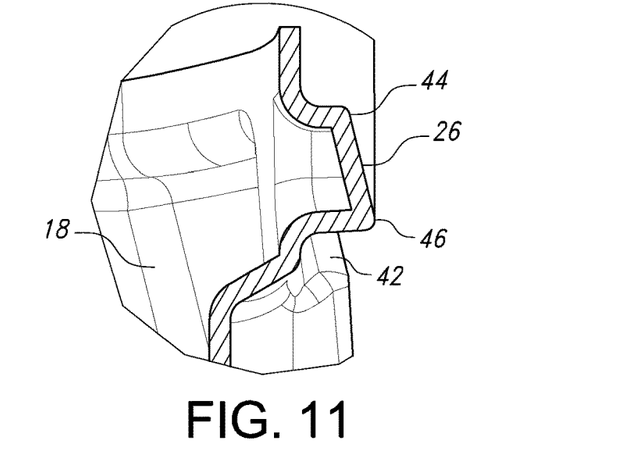
FIG. 11 is a detail section view of one of the bosses on the sidewall of the bottom section.

FIGS. 9 and 10 show top and bottom views of the bottle 10. FIG. 11 shows a detail view of one of the bosses 26 extending from the sidewall 18. The bosses 26 are configured so that the lower ends 46 slope outwardly from the upper ends 44. This makes it easier to push the latches 30 over the bosses 26 and more firmly secures the top section 14 to the bottom section 12. FIG. 11 also shows the detent 42 in the surface of the sidewall 18. The detent 42 allows the user to slide one or more fingers under the latch 30 to disengage it from the boss 26.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

The invention claimed is:

1. A bottle for storing grass seeds, soil, and/or fertilizer used for filling a golf divot, the bottle comprising:
a bottom section comprising a base and a perimetrical sidewall extending therefrom to an open end to define an interior, and at least two bosses extending outwardly from the sidewall at the open end; and
a top section having a perimetrical edge, at least two latches including apertures sized to receive the boss and extending from and being integrally formed in the perimetrical edge, and a top surface comprising a spout having a mouth wherein a curved sidewall of the spout slopes downwardly from an edge at the mouth and outwardly to terminate at the perimetrical edge of the top section, the perimetrical edge having a circular shape except for a straight section aligned with the mouth of the spout, wherein the top section is removably secured to the open end of the bottom section by pivoting the latches downwardly such that the apertures of the latches engage the bosses to secure the top section to the bottom section without the use of threads.

2. The bottle according to claim 1, wherein the bottom section further comprises a flanged ring extending outwardly from a midsection of the perimetrical sidewall.

3. The bottle according to claim 1, wherein the bottom section further comprises one or more handgrips in the perimetrical sidewall.

4. The bottle according to claim 1, wherein the bottom section further comprises a handle attached to the perimetrical sidewall, the handle being positioned below and substantially in-line with the mouth of the spout.

5. The bottle according to claim 4, wherein the handle extends between the flanged ring and the open end.

6. The bottle according to claim 4, wherein the one or more handgrips are located between the base and a flanged ring extending outwardly from a midsection of the perimetrical sidewall.

7. The bottle according to claim 4, wherein the open end of the bottom section slopes upwardly and away from the handle.

8. The bottle according to claim 1, wherein each of the at least two bosses are located on opposite sides of the perimetrical sidewall in a recessed portion of the perimetrical sidewall.

9. The bottle according to claim 1, wherein each of the at least two latches is u-shaped to form the aperture, wherein the u-shaped latches include two legs, each leg having an upper portion being separately and integrally attached to the perimetrical sidewall of the top section, and wherein the at least two bosses are sized to fit within the aperture and engage the latch when pivoted onto the boss.

10. The bottle according to claim 1, wherein the spout has a curved outer surface, a distal end, and a proximal end, wherein the distal end has a cross-sectional area that is less than a cross-sectional area of the proximal end.

11. The bottle according to claim 1, wherein the spout has an opening that provides communication with the interior.

12. An assembly comprising the bottle of claim 1 and a holder, the holder comprising:
a tubular sleeve having a sidewall extending between top and bottom open ends, wherein the top end of the tubular sleeve is configured to receive the bottom section of the bottle; and
one or more mounting studs and/or apertures for securing the holder to a structure on a golf cart.

13. The assembly according to claim 12, wherein the bottle is inserted into the holder until engaged by the flanged ring.

14. The assembly according to claim 12, wherein a section of the sidewall of the tubular sleeve is substantially flat.

15. A bottle for storing grass seed, soil and/or fertilizer for filling a golf divot, the bottle comprising:
a bottom section comprising a lower base and a perimetrical sidewall extending upwardly to an open top end to define an interior, and at least two outwardly extending bosses positioned adjacent the open top end; and
a top section adapted to enclose the open top end of the bottom section, the top section including a spout having an enlarged mouth providing access to the bottle interior, the spout having curved sidewalls which slope downwardly from an edge of the mouth and outwardly to terminate at a perimeter edge of the top section, wherein the perimeter edge has a circular shape except for a straight section aligned with the mouth of the spout, and wherein the at least two latches are formed on opposite sides of the circular portion, the perimeter edge of the top section including a downward extending perimetrical sidewall which overlaps a circumferential edge of the bottom section open top end, wherein the perimetrical sidewall includes at least two U-shaped latches having two legs forming an aperture therebetween, wherein each leg includes an upper portion which is integrally formed in the perimetrical sidewall, and wherein the latch apertures are sized to engage the at least two bosses to secure the top section to the bottom section.

16. The bottle according to claim 15, wherein the bottom section includes a finger detent positioned below the at least two bosses to allow user access to grasp the bottom of the at least two latches to disengage the respective latch from the respective boss.

17. A container for storing grass seed, soil and/or fertilizer for filling a golf divot, the container comprising:
a bottom section including a lower base and a perimetrical sidewall extending upwardly to an open top and to define an interior, and at least two outwardly extending bosses positioned adjacent the open top end; and
a top cover section sized and shaped to enclose the open top end of the bottom section, the top cover section being a unitary, integrally formed cover which includes a spout having an open mouth, the top cover section having a perimetrical edge configured to surround the open top end of the bottom section, the top cover section further including a pair of u-shaped latches forming an aperture, each latch including two legs, one leg located on each side of the aperture, each leg having an upper end integrally formed to an outer surface of the top cover section perimetrical edge such that the latches are pivotable from the perimetrical edge to engage and disengage the outwardly extending bosses on the bottom section in the latch apertures; wherein the perimetrical edge has a circular shape except for a straight section aligned with the mouth of the spout, and wherein the at least two latches are formed on opposite sides of the circular portion.

18. A container according to claim 17, wherein the top section is injection molded and includes rubber additive based polypropylene and the bottom section is blow-molded polyethylene.

* * * * *